United States Patent
Hammond

(10) Patent No.: US 10,836,685 B2
(45) Date of Patent: Nov. 17, 2020

(54) METHOD FOR PROVIDING A PLANT COMPOSITION

(71) Applicant: CCM RESEARCH LIMITED, Moreton in Marsh (GB)

(72) Inventor: Peter Hammond, Hailey (GB)

(73) Assignee: CCM RESEARCH LIMITED, Moreton in Marsh (GB)

( * ) Notice: Subject to any disclaimer, the term of this patent is extended or adjusted under 35 U.S.C. 154(b) by 50 days.

(21) Appl. No.: 15/865,853

(22) Filed: Jan. 9, 2018

(65) Prior Publication Data

US 2018/0127323 A1 May 10, 2018

Related U.S. Application Data

(63) Continuation of application No. 14/424,998, filed as application No. PCT/GB2013/052264 on Aug. 29, 2013, now abandoned.

(51) Int. Cl.
| | |
|---|---|
| *C05B 17/00* | (2006.01) |
| *C05C 3/00* | (2006.01) |
| *C05C 9/00* | (2006.01) |
| *B01D 53/62* | (2006.01) |
| *C05F 11/00* | (2006.01) |
| *C05D 7/00* | (2006.01) |
| *B01D 53/50* | (2006.01) |

(52) U.S. Cl.
CPC .............. *C05B 17/00* (2013.01); *B01D 53/62* (2013.01); *C05C 3/005* (2013.01); *C05C 9/005* (2013.01); *C05D 7/00* (2013.01); *C05F 11/00* (2013.01); *B01D 53/508* (2013.01); *Y02C 10/04* (2013.01)

(58) Field of Classification Search
CPC ........... C05B 17/00; C05D 7/00; C05C 3/005; C05C 9/005; C05F 11/00; B01D 53/62; B01D 53/508; Y02C 10/04
See application file for complete search history.

(56) References Cited

U.S. PATENT DOCUMENTS

| | | | |
|---|---|---|---|
| 1,490,774 | A | 4/1924 | Hamist |
| 2,142,965 | A | 1/1939 | Hale |
| 4,259,147 | A | 3/1981 | Gordy |
| 6,106,593 | A | 8/2000 | Golden |
| 8,414,853 | B2 | 4/2013 | Liu |
| 8,545,781 | B1 | 10/2013 | Yaumi |
| 8,715,393 | B2 | 5/2014 | Wright |
| 8,734,571 | B2 | 5/2014 | Golden |
| 2008/0102502 | A1 | 5/2008 | Foody et al. |
| 2009/0022791 | A1 | 1/2009 | Obae et al. |
| 2011/0203311 | A1 | 8/2011 | Wright et al. |
| 2011/0293493 | A1 | 12/2011 | Johnston et al. |
| 2012/0076711 | A1 | 3/2012 | Gebald et al. |
| 2012/0125062 | A1 | 5/2012 | Blandy |
| 2012/0304858 | A1 | 12/2012 | Wright |
| 2015/0239786 | A1 | 8/2015 | Hammond |

FOREIGN PATENT DOCUMENTS

| | | |
|---|---|---|
| CN | 101804327 A | 8/2010 |
| DE | 10053359 A1 | 5/2002 |
| EP | 2532410 A1 | 12/2012 |
| GB | 194289 | 5/1924 |
| GB | 422061 | 1/1935 |
| GB | 2473737 A | 3/2011 |
| WO | 2010091831 A1 | 8/2010 |
| WO | 2011033311 A2 | 3/2011 |

OTHER PUBLICATIONS

Schulte, E.E. and Kelling, K.A. "Soil and Applied Phosphorus". Understanding Plant Nutrients A2520. University of Wisconsin-System Board of Regents and University of Wisconsin-Extension, Cooperative Extension. Jun. 13, 2010.*
Office Action for U.S. Appl. No. 14/424,997, dated May 10, 2016, AYL-0073, 24 pages.
International Preliminary Report on Patentability for PCT/GB2013/052262, dated Mar. 3, 2015 (7 pages).
International Search Report and Written Opinion for International Application No. PCT/GB2013/052262, dated Dec. 6, 2013 (10 pages).
Search Report for Patent Application No. GB1215379.7, dated Aug. 22, 2013 (1 page).
Search Report for Patent Application No. GB1215380.5, dated Jul. 8, 2013 (2 pages).
International Search Report and Written Opinion for PCT/GB2013/052264, dated Dec. 10, 2013 (8 pages).
International Preliminary Report on Patentability for PCT/GB2013/052264, dated Mar. 3, 2015 (6 pages).

* cited by examiner

*Primary Examiner* — Jennifer A Smith
(74) *Attorney, Agent, or Firm* — Hoffman Warnick LLC

(57) ABSTRACT

A method of providing a plant nutrient composition, the method comprising:
(a) contacting a cellulosic material with a composition comprising an amino compound;
(b) contacting the cellulosic material with a composition comprising carbon dioxide, sulfur dioxide and mixtures thereof;
(c) optionally, contacting the cellulosic material with a composition comprising a source of one or more elements selected from nitrogen, phosphorous, potassium, calcium, magnesium, sulphur, boron, cobalt, chlorine, copper, iron, manganese, molybdenum, zinc and sodium; and
(d) optionally, contacting the resultant material with a plant and/or a base growing medium.

9 Claims, 2 Drawing Sheets

METHOD FOR PROVIDING A PLANT COMPOSITION

CROSS-REFERENCE TO RELATED APPLICATIONS

Figure 1:
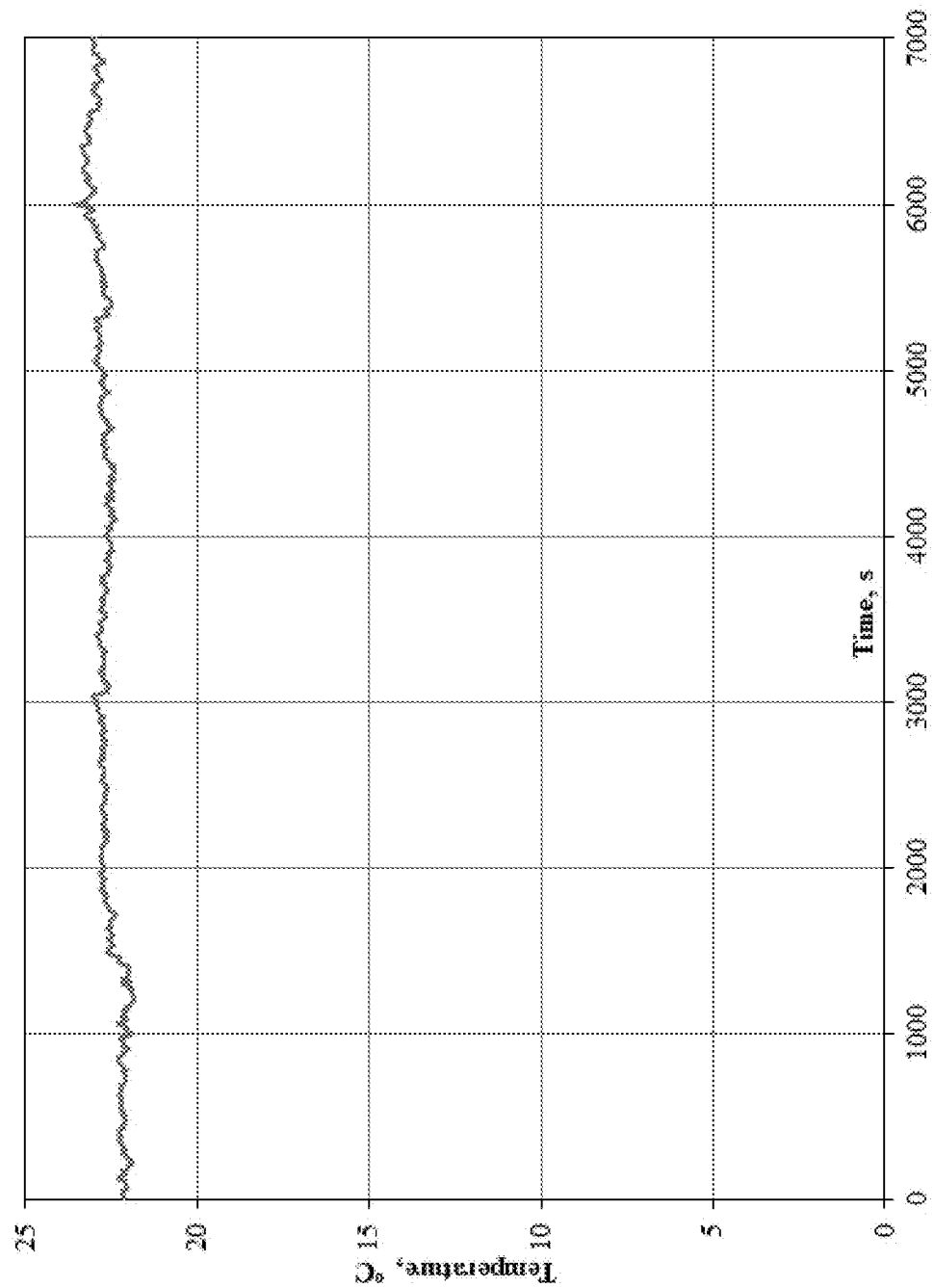
Figure 2:
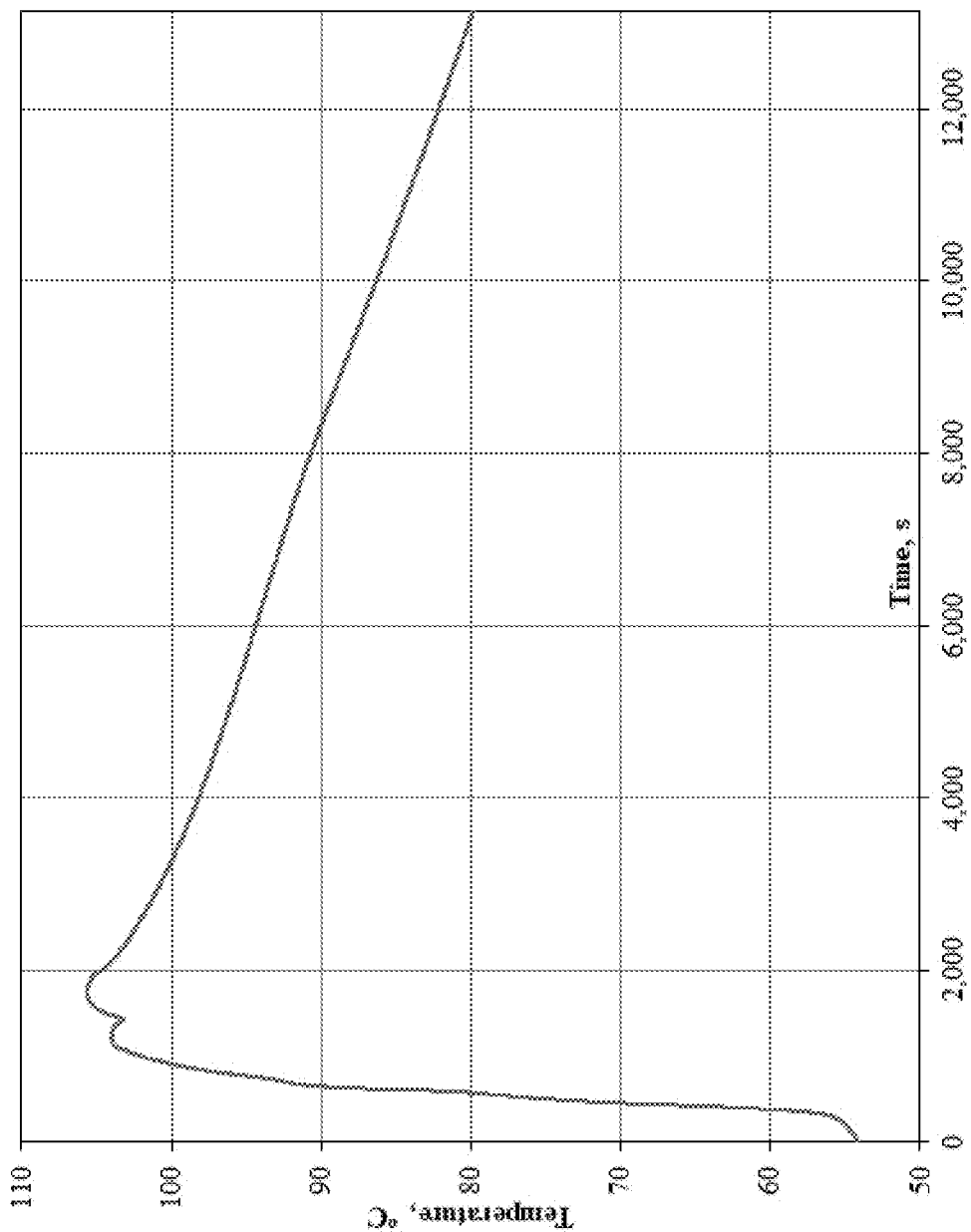

This application is a continuation of co-pending U.S. patent application Ser. No. 14/424,998, filed 27 Feb. 2015, which is the US National Stage of International Patent Application No. PCT/GB2013/052264, filed 29 Aug. 2013, which claims priority to United Kingdom Patent Application No. GB 1215380.5, filed 29 Aug. 2012, each of which is incorporated here for all that it contains as though fully set forth.

The present invention relates to plant nutrient compositions, fertiliser compositions and to methods of providing these.

Current global agricultural production consumes a vast amount of fertiliser. Fertilisers are added to a growing medium, for example soil to provide one or more of the nutrients essential for plant growth. These essential nutrients in the growing medium are depleted during plant growth and must be replaced to maintain the productivity of the growing medium. It is vital that agricultural productivity is maintained or improved in order to provide enough food for an expanding global human population. Alongside this requirement for high productivity is the need to minimise the environmental impact of farming. There are concerns over the contribution of modern agriculture to climate change due in part to the carbon dioxide emissions associated with current agricultural practice. The use of fertilisers can also cause significant environmental problems.

Modern fertilisers can be broadly categorised as inorganic or organic. Inorganic fertilisers typically contain three major components based on the elements nitrogen, phosphorus and potassium. The production of these components involves energy intensive methods such as the Haber-Bosch process for nitrogen, and ore mining and extraction for phosphorus and potassium. These methods are not sustainable due to their reliance on fossil fuels and the limited available deposits of phosphate ore. Other disadvantages of inorganic fertilisers include carbon dioxide emissions associated with their production, the pollution of waterways due to run-off of excess fertiliser, soil acidification and heavy metal accumulation in soil. Fertilisers based on organic matter are generally produced by less energy intensive and more sustainable methods. However, they are often more bulky than inorganic fertilisers, can have variable nutrient content and are often more expensive to produce than inorganic fertilisers.

It is an aim of the present invention to provide a plant nutrient composition having a lower environmental impact compared to some traditional fertilisers.

According to a first aspect of the present invention there is provided a method of providing a plant nutrient composition, the method comprising:
(a) contacting a cellulosic material with a composition comprising an amino compound;
(b) contacting the cellulosic material with a composition comprising carbon dioxide, sulfur dioxide and mixtures thereof;
(c) optionally, contacting the cellulosic material with a composition comprising a source of one or more elements selected from nitrogen, phosphorous, potassium, calcium, magnesium, sulphur, boron, cobalt, chlorine, copper, iron, manganese, molybdenum, zinc and sodium.
(d) optionally, contacting the resultant material with a plant and/or a base growing medium.

The present invention relates to a method of providing a plant nutrient composition. By a plant nutrient composition we mean to refer to a composition comprising at least one nutrient useful for plant growth or maintaining plant health.

The method involves treating a cellulosic material. Suitable cellulosic materials include natural cellulosic materials and semi-synthetic or processed cellulosic materials.

In some preferred embodiments the cellulosic material used in the method of the present invention is a fibrous material. The cellulosic material may comprise natural fibres and/or synthetic fibres and/or semi-synthetic fibres, for example regenerated cellulose products. Suitable synthetic fibres include polyamides, polyesters and polyacrylics. Preferably the material comprises natural fibres.

Preferably the cellulosic material is a natural cellulose material.

The use of natural fibres may improve the environmental profile of the plant nutrient composition provided by the method of the present invention.

Suitable natural cellulosic fibres for use herein include cotton, hemp, flax, silk, jute, kenaf, ramie, sisal, kapok, agave, rattan, soy bean, vine, banana, coir, stalk fibres and mixtures thereof.

In some preferred embodiments the cellulosic material comprises a waste product or a by-product from agriculture. Such cellulosic materials would otherwise have little or no value in other applications. Suitable waste products or by-products may be the stems, leaves, chaff or husks of crops, for example cereals or rapeseed. Most preferably the cellulosic material is straw or wood pulp.

In some embodiments the cellulosic material may be refined wood pulp, for example the material sold under the trade mark TENSEL.

In some embodiments the cellulosic material may be the waste directly obtained from pulp mills, for example pine pulp.

In some embodiments the cellulosic material may be a straw material obtained from cereals, for example wheat, rye or barley.

The cellulosic material is suitably provided as a finely divided particulate material. Suitably the cellulosic material has an average particle size of at least 10 microns, preferably at least 50 microns, more preferably at least 100 microns. The cellulosic material may have an average particle size of at least 0.2 mm, preferably at least 0.5 mm. The cellulosic material may have an average particle size of up to 10 cm, suitably up to 5 cm, preferably up to 1 cm, more preferably up to 0.5 cm.

In especially preferred embodiments the cellulosic material has an average particle size of from 0.5 to 3 mm.

Average particle size may suitably be measured by conventional sieving techniques.

Step (a) comprises contacting the cellulosic material with a composition comprising an amino compound. The amino compound may be selected from any compound containing an amino or substituted amino moiety, for example ammonia, an aliphatic or aromatic amine, an amide or urea. Preferably the amino compound is selected from ammonia or an amine.

In some preferred embodiments the amino compound comprises ammonia. By this we mean to include ammonium hydroxide, i.e. an aqueous ammonia composition.

Suitable amino compounds include natural compounds and synthetic compounds. A mixture of two or more amines may be used.

Suitable amines include aromatic and aliphatic amines. These amines may be substituted or unsubstituted. Examples of suitable amines include amino acids, alkanolamines, alkyl amines and alkenyl amines. Especially preferred amines for use herein are alkyl amines and alkanolamines.

The amino compound may be selected from ammonia, a primary amine, a secondary amine or a tertiary amine. Some preferred amines for use in step (a) of the present invention are primary amines, secondary amines, or mixtures thereof. Especially preferred amines for use herein are primary or secondary alkyl amines, especially alkyl amines having up to 12 carbon atoms, more preferably up to 4 carbon atoms. Preferred amines for use herein are methylamine, dimethylamine, ethylamine, diethylamine, propylamine, dipropylamine, butylamine, dibutylamine and mixtures and isomers thereof.

In some embodiments the composition applied in step (a) may comprise one or more natural amino compounds. Such compounds may be found in or derived from waste material, for example human or animal urine.

The use of amines derived from waste materials, for example human or animal urine may help improve the environmental profile of the material produced by the method of the present invention.

The composition used in step (a) of the present invention may comprise a neat concentrated amino compound in gaseous or liquid form or it may comprise one or more further components, for example a diluent or carrier. Preferably the composition used in step (a) is a liquid composition.

In some preferred embodiments the amino compound comprises an amine, for example a primary, secondary or tertiary amine. In such embodiments step (a) suitably comprises applying a composition comprising at least 10 wt % amino compound, suitably at least 40 wt %, preferably at least 60 wt % or at least 70 wt %.

The above amounts refer to the total of all amino compounds present in the composition.

Preferably the composition containing an amine contains at least 5 wt % water, preferably at least 10 wt % water, most preferably at least 15 wt % water.

In some especially preferred embodiments the composition comprises from 75 to 85 wt % of an amine and from 15 to 25 wt % water.

In some preferred embodiments the amino compound comprises ammonia (or ammonium hydroxide). In such embodiments step (a) suitably comprises applying a composition comprising at least 1 wt % ammonium hydroxide, suitably at least 5 wt %, preferably at least 10 wt % or at least 15 wt %.

Preferably the composition containing ammonium hydroxide comprises at least 10 wt % water, preferably at least 30 wt % water, most preferably at least 50 wt % water, for example at least 60 wt %.

In some especially preferred embodiments the composition comprises from 20 to 30 wt % ammonium hydroxide and from 70 to 80 wt % water.

In step (a) the cellulosic material is suitably contacted with a composition comprising an amino-compound wherein the weight ratio of the amino composition to cellulosic material is preferably at least 0.1:1, preferably at least 0.5:1, more preferably at least 1:1.

Suitably in step (a) the weight ratio of amino containing composition contacted with the cellulosic material is up to 100:1 (amino composition:material), preferably up to 50:1, more preferably up to 20:1, for example up to 15:1.

In some especially preferred embodiments in step (a) the cellulosic material is contacted with from 1.5 to 5, preferably from 2 to 3 parts by weight of a composition comprising an amino-compound.

In some preferred embodiments in step (a) the cellulosic material is contracted with from 15 to 20, preferably from 10 to 15 parts by weight of a composition comprising an amino compound.

In preferred methods the surface of the cellulosic material and the amino compound are believed to interact in a way which (though not at present fully understood) appears to promote the take-up of carbon dioxide and/or sulfur dioxide in step (b).

Without being bound by theory, it is believed that hydrogen bonding occurs between the amino functionality and the surface of the cellulosic material.

Preferably step (a) involves contacting the material with a composition comprising an amino compound for a period sufficient to allow coating of the fibres with the amino compound. This may be achieved within a period of less than 1 hour, for example less than 30 minutes or less than 15 minutes.

The composition comprising an amino compound may be contacted with the cellulosic material by any suitable means. Such means as will be known to the person skilled in the art. For example the composition may be applied by spraying, padding or immersion. Suitably a solution of amine in a solvent may be applied to the material and then the material dried to effect evaporation of excess solvent and/or amine. Suitable solvents include water, organic solvents and mixtures thereof. In some embodiments the composition used in step (a) comprises an amino compound provided as a vapour.

In some preferred embodiments the composition comprising the amino compounds is poured onto the cellulosic material and they are then mixed together Step (b) of the present invention involves contacting the cellulosic material with a composition comprising carbon dioxide, sulfur dioxide and mixtures thereof. Preferably step (b) is carried out after step (a) and thus the material treated in step (b) has already been treated with an amino compound.

When the composition used in step (b) comprises carbon dioxide may be provided as carbon dioxide gas, as supercritical carbon dioxide or as solid carbon dioxide. In preferred embodiments the carbon dioxide is in gaseous form.

When the composition used in step (b) comprises sulfur dioxide this is preferably in gaseous form.

In preferred embodiments the gas used in step (b) is provided by a gaseous composition comprising at least 1 wt % carbon dioxide. Preferably composition contacted with the material in step (b) is a gaseous composition comprising at least 5 wt % carbon dioxide, more preferably 10 wt % carbon dioxide, still more preferably 20 wt % carbon dioxide. In some embodiments step (b) involves treating the material with a composition comprising at least 50 wt % carbon dioxide, for example at least 75 wt %, at least 90 wt % or at least 95 wt %.

In some embodiments the composition used in step (b) may comprise purified exhaust gases from the combustion of fossil fuels. For example carbon dioxide may be captured from exhaust gases using a method of the prior art, released and used in step (b) of the method of the present invention. In such embodiments the composition suitably comprises at least 80 wt % carbon dioxide, for example at least 90 wt %, at least 95 wt % or at least 98 wt %.

Preferably the composition contacted with the material in step (b) of the method of the present invention comprises carbon dioxide.

In some embodiments the composition contacted with the material comprises sulfur dioxide.

The composition may consist essentially of sulfur dioxide. Preferably it comprises one or more further components.

In some preferred embodiments the composition comprises a carbon dioxide and sulfur dioxide. It may comprise other components, suitably other gaseous components, for example nitrogen.

In some preferred embodiments the composition contacted with the material in step (b) comprises or is derived from the exhaust gas of a combustion system. For example the composition may be the flue or a power station, for example a wood-burning or coal-burning power station.

In some embodiments such exhaust gases may be concentrated or otherwise treated prior to contact with the material.

In especially preferred embodiments the carbon dioxide and/or sulfur dioxide is provided by the exhaust of a fossil fuel burning engine, boiler, furnace or turbine. Thus the present invention may involve a method of capturing carbon from the atmosphere.

A particular advantage of the method of the present invention is that it can be used to directly capture carbon dioxide from the flue gases of a power station.

In some embodiments the composition of the present invention comprises from 1 to 50 wt % carbon dioxide, preferably from 10 to 35 wt %, suitably from 15 to 25 wt %, for example from 17 to 22 wt %.

The composition used in step (b) may comprise at least 0.1 wt % sulfur dioxide, preferably at least 0.5 wt %, for example at least 1 wt %. It may comprise up to 20 wt % sulfur dioxide, for example up to 10 wt % or up to 7 wt %.

In one embodiments the composition contacted with the material composition in a gaseous composition comprising from 50 to 90 wt %, preferably 60 to 80 wt % nitrogen, from 10 to 40 wt %, preferably 20 to 30 wt % carbon dioxide and up to 20 wt %, preferably up to 10 wt % sulfur dioxide.

In some embodiments in step (b) a gaseous composition may be pumped into a vessel containing the material. In some embodiments the cellulosic material may have been dried following step (a). Alternatively the material may still be wet.

The composition contacted with the composition in step (b) may be at atmospheric pressure or it may be at higher pressures. The skilled person will appreciate that when elevated pressures are used the contact times needed are generally shorter than when lower pressures are used.

In some embodiments the composition contacted with the material in step (b) may comprise carbon dioxide, sulfur dioxide or a mixture thereof along with a diluent or carrier. In some embodiments the composition may comprise only carbon dioxide, sulfur dioxide or a mixture thereof.

In some embodiments the composition contacted with the material in step (b) consists essentially of carbon dioxide, i.e. it is provided from a source of carbon dioxide without the addition of a diluent or carrier. Minor impurities may be present.

In embodiments in which the cellulosic material is contacted with neat carbon dioxide gas this may be provided at a pressure of up to 40,000 kPa, preferably from 100 to 3000 kPa. In some embodiments carbon dioxide may be delivered to the cellulosic material at ambient pressure, and preferably at ambient temperature. In preferred embodiments the carbon dioxide gas is at a supra-atmospheric pressure.

In some especially preferred embodiments in which the composition contacted with the material in step (b) comprises flues gases, this is typically at a pressure of from 100 to 500 kPa.

The uptake of carbon dioxide on the cellulosic material is preferably at least 1% omf, preferably at least 5% omf, more preferably at leas 10% omf, for example at least 15% omf.

The uptake of carbon dioxide on the cellulosic material may be up to 100% omf, suitably up to 80% omf, preferably up to 60% omf, preferably up to 40% omf, for example up to 30% omf, or up to 25% omf.

By % omf (% on mass of fibre) we mean to refer to the mass of carbon dioxide as a percentage of the mass of fibres contacted with the composition comprising carbon dioxide.

For the avoidance of doubt, the above amounts refer to the increase in weight of the treated cellulosic material, i.e. material that carries an amino compound on its surface.

In the method of the present invention the cellulosic material preferably comprises small particles of cellulosic fibres.

In preferred embodiments the fibres are agitated in step (b). Preferably agitation is achieved by blowing a gaseous composition comprising carbon dioxide through the fibres.

Preferably step (b) of the method of the present invention comprises blowing exhaust gases from the combustion of a fossil fuel through fibres of cellulosic material which carry an amine compound.

A particular advantage of the present invention is that the cellulosic fibres present a large surface area for contact with gases.

Without being bound by theory it is believed that the fibres used in the present invention are not too closely packed. The fibres are typically porous materials and interact with each other through hydrogen bonding. As a result carbon dioxide is able to flow through channels between fibres and within the fibres themselves.

These fibres can effectively float in a gas stream and behave as a fluid.

The method of the present invention may suitably be carried out using a fluidised bed. These are known to the person skilled in the art.

Preferably the method of the present invention involves a continuous process.

Without wishing to be bound by theory it is believed that the carbon dioxide and/or sulfur dioxide interacts with the amino compound which is carried by the surface of the cellulosic material following step (a). The nature of this interaction is not fully understood. It is believed that there may be a polar interaction, a hydrogen bond may form or covalent bonding may occur.

It has been surprisingly found that retention of carbon dioxide on the fibre can be improved by the addition of a metal ion.

Thus in some preferred embodiments the method of the present invention further comprises contacting the cellulosic material with a source of metal ions.

Suitable metal ions include any monovalent, divalent and trivalent ions, especially those having low toxicity.

Preferred metal ions include alkali metal ions and alkaline earth metal ions. Especially preferred are alkali metal ions. Most preferred are sodium ions.

The metal ions are preferably provided in aqueous solution. They may be provided in the form of a salt.

Preferably the source of metal ions is an alkali metal hydroxide solution. Most preferably it is a solution of sodium hydroxide.

The cellulosic material may be contacted with the source of metal ions before step (a), during step (a), between steps (a) and step (b) and/or during step (b).

Preferably the material is contacted with a source of metal ions during step (a) and step (a) may therefore comprise contacting the cellulosic material with a composition comprising an amino compound and a source of metal ions.

Steps (a) and (b) of the present invention may be carried out sequentially or simultaneously. In embodiments of the present invention in which steps (a) and (b) are carried out simultaneously the surface of the material is treated with a single composition comprising an amino compound and carbon dioxide and/or sulfur dioxide, and optionally a source of metal ions.

Steps (c) and (d) are optional.

In one embodiment the method of the present invention comprises the steps of:
(a) contacting a cellulosic material with a composition comprising an amino compound;
(b) contacting the cellulosic material with a composition comprising carbon dioxide, sulfur dioxide or a mixture thereof; and
(c) contacting the cellulosic material with a composition comprising a source of one or more elements selected from nitrogen, phosphorous, potassium, calcium, magnesium, sulphur, boron, cobalt, chlorine, copper, iron, manganese, molybdenum, zinc and sodium.

Step (c) comprises contacting the cellulosic material with a composition comprising a source of one or more of the elements. These elements may be regarded as plant macro nutrients or plant micro nutrients. Suitable plant macro-nutrients include nitrogen, phosphorus, potassium, calcium, magnesium and sulphur. Suitable plant micro-nutrients are boron, chlorine, copper, iron, manganese, molybdenum, cobalt, zinc and sodium.

The composition contacted with the cellulosic material in step (c) may comprise a source of macro-nutrients. It may comprise a source of micro-nutrients. It may comprise a source of macro-nutrients and a source of micro-nutrients.

Preferably step (c) comprises contacting the cellulosic material with a composition comprising a source of one or more elements selected from nitrogen, phosphorus, calcium, magnesium and boron.

Preferably step (c) comprises contacting the cellulosic material with a composition comprising one or more elements selected from phosphorous, nitrogen and potassium.

In some embodiments step (c) comprises contacting the cellulosic material with a composition comprising a source of phosphorous.

In some embodiments step (c) comprises contacting the cellulosic material with a composition comprising a source of potassium.

Step (c) comprises contacting the cellulosic material with a composition comprising a source of one or more elements. The source of an element may comprise the element in its neat elemental form or it may comprise the element in combination with one or more elements in the form of a compound or mixture.

Suitable compounds which may be included in the composition contacted with the material in step (c) include urea, ammonia, sodium nitrate, ammonium sulphate, ammonium nitrate, ammonium phosphate, single superphosphate, superphosphate of lime, monopotassium phosphate, dipotassium phosphate, tripotassium phosphate, phosphoric acid, potassium chloride, potassium oxide, potassium sulphate, potassium magnesium sulphate, calcium carbonate, calcium sulphite, calcium magnesium carbonate, calcium oxide, magnesium sulphate, magnesium oxide, sulphur, borax, boric acid, boron superphosphate, calcium borate, magnesium borate, copper sulphate, ferrous sulphate, manganese superphosphate, manganese oxide, molybdenum oxide, cobalt sulphate and sulphate. Other common fertiliser ingredients known to the person skilled in the art may also be included.

In some preferred embodiments the composition used in step (c) comprises dissolved potassium and phosphate ions. In one preferred embodiment the composition comprises phosphoric acid, potassium nitrate and calcium oxide.

In some embodiments the elements included in the composition used in step (c) may be selected to achieve a particular purpose. For example if a particular plant is deficient in a specific nutrient this could be included in the production of a composition for this purpose. A particular nutrient may be selected for example if it is needed during a specific time in the life-cycle of a plant.

Preferably the composition contacted with the cellulosic material in step (c) is a liquid composition. Preferably it is an aqueous composition. It is suitably in the form of a solution and/or suspension. In some embodiments the composition has a pH less than 10, preferably less than 9, more preferably less than 8, suitably less than 7.

Step (c) may be carried out before step (a). Step (c) may be carried out before step (b). Step (c) may be carried between step (a) and step (b). Step (c) is preferably carried out after steps (a) and (b). Preferably steps (a), (b) and (c) are carried out sequentially.

Step (d) is an optional step. It may be carried out after step (a), (b) and (c) or it may be carried out after steps (a) and (b).

Step (d) involves contacting the mixture obtained following steps (a), (b), and optionally (c) with a plant and/or a base plant growing medium. In such embodiments the composition obtained by steps (a), (b) and optionally (c) is contacted with a plant or a base plant growing medium in the manner of a traditional fertiliser. That is, the composition may be added to the base growing medium to enhance the plant nutrient content of the base growing medium, or it may be contacted with a plant. Typically it is contacted with an above ground part of the plant for example stems or leaves.

The present invention may further provide the use of a composition obtained by steps (a) and (b) of the method of the first aspect as a fertiliser.

The present invention may further provide the use of a composition obtained by steps (a), (b) and (c) of the method of the first aspect as a fertiliser.

In embodiments in which step (d) is not present, the composition obtained following steps (a), (b) and optionally (c) may be used as a plant growing medium. That is plants may be grown directly in this material, suitably without significant dilution with a further base plant growing medium.

The present invention may provide the use of a composition obtained by steps (a) and (b) of the method of the first aspect as a plant growing medium.

The present invention may provide the use of a composition obtained by steps (a), (b) and (c) of the method of the first aspect as a plant growing medium.

According to a second aspect of the present invention there is provided a plant nutrient composition comprising a cellulosic material which has been treated with an amino compound and carbon dioxide and/or sulfur dioxide.

Preferably the plant nutrient composition comprises a cellulosic material which has been treated with an amino compound and carbon dioxide.

Preferably the cellulosic material has been further treated with a composition comprising a source of one or more elements selected from nitrogen, phosphorous, potassium, calcium, magnesium, sulphur, boron, cobalt, chlorine, copper, iron, manganese, molybdenum, zinc and sodium.

Thus in a preferred embodiment the plant nutrient composition of the second aspect may comprise a cellulosic material that has been treated with an amino compound, carbon dioxide and a source of one or more elements selected from nitrogen, phosphorous, potassium, calcium, magnesium, sulphur, boron, cobalt, chlorine, copper, iron, manganese, molybdenum, zinc and sodium.

Preferred features of the second aspect are as defined in relation to the first aspect. Further preferred features described in relation to the second aspect apply to the first aspect.

Preferably the plant nutrient composition of second aspect is preferred by step (a), (b) and optionally (c) of the method of the first aspect.

The plant nutrient composition of the second aspect may be used directly itself as a growing medium. That is, plants and/or seeds may be planted directly into the composition in a manner similar to that in which compost is used. Such a use may be particularly appropriate if the method used to prepare the composition includes only steps (a) and (b).

In some embodiments the composition of the present invention may be used in the manner of a traditional fertiliser. For example the composition may be contacted with a base plant growing medium.

Alternatively the composition may be contacted with a part of a plant that is above the ground, for example the leaves, flowers, fruit or stem.

The composition of the second aspect may be provided in the form of a solid or a liquid. In embodiments in which the composition comprises a cellulosic material that has been treated with an amino compound and carbon dioxide and/or sulfur dioxide it may be in the form of a lumpy solid, having a consistency similar to compost.

In embodiments in which the composition is a liquid composition it may be sprayed or poured onto the base growing medium or it may be sprayed onto an above ground portion of the plant. In embodiments in which the composition is a solid it may be spread onto the surface of the base growing medium or it may be mixed into the base growing medium.

By base growing medium we mean to refer to a standard material that is commonly used to grow plants, for example soil or compost.

Step (c) of the method of the present invention preferably comprises contacting the cellulosic material with a liquid. The resultant product may be in the form of a solution/suspension of the treated material.

Such a liquid composition may be further processed if necessary to provide a liquid composition suitable for spraying.

In some alternative preferred embodiments the composition may be further processed to provide a solid composition suitable for spreading. Suitably the composition may be heated, preferably to a temperature of at least 50° C., for example at least 60° C. The heated composition may then be spray dried. Water may be removed from the composition. In some preferred embodiments the composition is provided in powder or granular form.

The invention will now be further described with reference to the following non-limiting examples.

EXAMPLE 1

A composition of the present invention was prepared by the following procedure.

10 kg of cellulose based carbon loaded substrate formed from the combination of straw derived cellulose and diethylamine exposed to an excess of carbon dioxide was placed in a stirred stainless steel vessel and kept at a temperature of less than 40° C. 10 kg of 30% phosphoric acid solution into which 1 kg of potassium nitrate and 1 kg of calcium oxide had been dissolved was added to the vessel containing the carbon loaded substrate and mixed for 15 minutes. The resulting mixture is heated to 60° C. and then passed to a spray drying unit for the removal of excess water. The resultant powder can be used as a fertiliser.

EXAMPLE 2

A composition of the present invention was prepared by the following procedure.

1 kg of wheat based bioethenol waste was mixed with 500 ml of a composition comprising monoethanolamine and 20 wt % water in a tumble mixer for 10 minutes at standard temperature and pressure. This mixture was then passed into a screw mixer through which pure $CO_2$ at a pressure of 5 bar was passed. The material was contacted with the the $CO_2$ in the screw mixer for 5 mins at stp. After 5 mins 200 ml of 50 wt % aqueous NaOH was added to the screw mixer with $CO_2$ being continuously fed into the system for an additional 5 minutes. After the 5 minutes has elapsed the screw mixer was emptied via a cooled (<50° C.) pelletising dye. This material obtained is suitable for use as a fertiliser.

The invention claimed is:

1. A method of providing nutrients to a plant, the method comprising:
   (a) contacting a cellulosic material with a composition comprising an amino compound;
   (b) contacting the cellulosic material with a gaseous composition comprising at least 5 wt % carbon dioxide, wherein step (b) is carried out after step (a); and
   (d) contacting the resultant cellulosic material that has been treated with the amino compound and the carbon dioxide with a plant and/or a base growing medium, wherein the cellulosic material is a fibrous material.

2. A method according to claim 1, further comprising a step (c) between step (b) and step (d) of contacting the cellulosic material with a composition comprising a source of one or more elements selected from a group consisting of: nitrogen, phosphorous, potassium, calcium, magnesium, sulphur, boron, cobalt, chlorine, copper, iron, manganese, molybdenum, zinc, and sodium.

3. A method as claimed in claim 1, wherein the cellulosic material comprises natural fibres.

4. A method as claimed in claim 1, wherein the cellulosic material comprises natural cellulosic fibres selected from a group consisting of: cotton, hemp, flax, silk, jute, kenaf, ramie, sisal, kapok, agave, rattan, soy bean, vine, banana, coir, stalk fibres, and mixtures thereof.

5. A method as claimed in claim 1, wherein the amino compound used in step (a) is selected from ammonia or an amine.

6. A method as claimed in claim 5, in which step (c) comprises contacting the cellulosic material with a composition comprising a source of one or more plant macro-nutrients selected from a group consisting of: nitrogen, phosphorus, potassium, calcium, magnesium, and sulphur; and contacting the cellulosic material with a source of plant micro-nutrients selected from a group consisting of: boron, chlorine, copper, iron, manganese, molybdenum, cobalt, zinc, and sodium.

7. A method as claimed in claim 6, in which step (c) comprises contacting the cellulosic material with a composition comprising a source of phosphorous, nitrogen, or potassium.

8. A method as claimed in claim 2, in which compounds included in the composition contacted with the material in step (c) are selected from a group consisting of: urea, ammonia, sodium nitrate, ammonium sulphate, ammonium nitrate, ammonium phosphate, single superphosphate, superphosphate of lime, monopotassium phosphate, dipotassium phosphate, tripotassium phosphate, phosphoric acid, potassium chloride, potassium oxide, potassium sulphate, potassium magnesium sulphate, calcium carbonate, calcium sulphite, calcium magnesium carbonate, calcium oxide, magnesium sulphate, magnesium oxide, sulphur, borax, boric acid, boron superphosphate, calcium borate, magnesium borate, copper sulphate, ferrous sulphate, manganese superphosphate, manganese oxide, molybdenum oxide, and cobalt sulphate.

9. A method as claimed in claim 2, in which the composition used in step (c) comprises dissolved potassium and phosphate ions.

* * * * *